United States Patent [19]

Legeza

[11] 4,258,885

[45] Mar. 31, 1981

[54] NOZZLE TIP AND METHOD OF MANUFACTURE

[76] Inventor: Thomas B. Legeza, 6122 St. Joseph Dr., Seven Hills, Ohio 44131

[21] Appl. No.: 22,957

[22] Filed: Mar. 23, 1979

[51] Int. Cl.³ .......................... B05B 5/02; B23P 15/00
[52] U.S. Cl. ................................. 239/707; 29/157 C; 239/599; 239/601
[58] Field of Search ............... 239/597, 599, 600, 601, 239/707; 29/157 C; 51/217 A; 409/81–83, 224

[56] References Cited

U.S. PATENT DOCUMENTS

| | | |
|---|---|---|
| 1,992,622 | 2/1935 | Junkers . |
| 2,084,057 | 6/1937 | French . |
| 2,332,407 | 10/1943 | Spenle .................... 29/157 C X |
| 2,774,631 | 12/1956 | Wahlin . |
| 2,812,978 | 11/1957 | Billman . |
| 2,971,250 | 2/1961 | Wahlin ........................ 29/157 C |
| 3,000,576 | 9/1961 | Levey et al. .................. 239/601 X |
| 3,414,196 | 12/1968 | Legeza et al. .................. 239/106 |
| 3,447,756 | 6/1969 | Lawrence, Jr. ................ 239/600 X |
| 3,523,350 | 8/1970 | Ferri ............................. 29/157 C |
| 3,578,246 | 5/1971 | Davis, Sr. .......................... 239/8 |
| 3,604,632 | 9/1971 | Eichelman ...................... 239/419.3 |
| 3,608,832 | 9/1971 | Hughes et al. ................... 239/419 |
| 3,618,863 | 11/1971 | Hughes .......................... 239/419.3 |
| 3,633,828 | 1/1972 | Larson .............................. 239/412 |
| 3,669,419 | 6/1972 | Petersen et al. .................... 239/544 |
| 3,672,578 | 6/1972 | Wayne ............................ 239/590 |
| 3,684,194 | 8/1972 | Wayne ............................ 239/493 |
| 3,705,693 | 12/1972 | Franz ............................. 239/600 |
| 3,750,947 | 8/1973 | Hughes .............................. 239/11 |
| 3,764,069 | 10/1973 | Runstadler et al. .................. 239/8 |
| 3,851,468 | 12/1974 | Frankle et al. .................... 60/258 |
| 4,074,857 | 2/1978 | Calder ............................ 239/119 |
| 4,112,568 | 9/1978 | Hale ........................... 239/600 X |

FOREIGN PATENT DOCUMENTS

| | | | |
|---|---|---|---|
| 451729 | 8/1936 | United Kingdom ............... 29/157 C |
| 594751 | 11/1947 | United Kingdom ............... 239/597 |

Primary Examiner—Andres Kashnikow
Attorney, Agent, or Firm—David A. Burge

[57] ABSTRACT

A nozzle tip especially useful with airless sprayers is formed from a plurality of parts, all of which are fabricated from blanks of hard, wear-resistant materials such as ceramics or powdered metals. Exterior surface portions of the nozzle tip parts are final-formed during formation of the blanks, typically during a sintering operation. Mating interior surface portions of the nozzle tip parts, as well as a nozzle orifice portions, are formed quickly and inexpensively by machining. Principles of the invention are also applicable to spray nozzles of the electrostatic type. A thin, electrically conductive blade may be clamped between or among adjacent nozzle tip parts with a portion of the blade extending forwardly of the nozzle tip parts to charge liquid particles being sprayed.

21 Claims, 18 Drawing Figures

NOZZLE TIP AND METHOD OF MANUFACTURE

BACKGROUND OF THE INVENTION

1. Field of the Invention

The present invention relates generally to a spray nozzle wherein a plurality of nozzle tip parts cooperate to define a nozzle tip assembly, and to a novel and improved method of manufacturing the nozzle tip parts.

2. Prior Art

In many applications where liquid is to be sprayed, it is important that the liquid be dispersed uniformly and in a precise spray pattern. Uniform dispersion is more readily attained where the liquid being sprayed is highly "atomized", i.e., reduced to a very fine spray. Airless sprayers have been found to be particularly effective in creating a highly atomized spray. In part, this is because airless sprayers utilize high pressures on the order of 1,000 to 3,000 pounds per square inch to force liquid through a very minute nozzle orifice.

Unlike mixing-type spray guns wherein air is mixed with the liquid prior to the liquid's being discharged from the nozzle tip, airless spray guns discharge a homogeneous mixture of liquid through the nozzle tip. Because the liquid is under such great pressure and because the orifice is so small, thorough atomization of the liquid tends to result as the liquid suddenly expands upon discharge from the nozzle orifice. Atomization is sufficiently thorough to provide a spray in the form of a uniform mist of the type desired for use in painting furniture, automobiles, and the like.

Nozzle tips used in airless sprayers are ordinarily formed from a single piece of tungsten carbide steel or a similar hard, wear-resistant material. In order to create precise spray patterns of uniform density, it is important that the orifices in these single-piece tips be formed to exact dimensions. Precision machining a unitary nozzle tip part is an expensive operation which is subject to error and which is highly sensitive to machine tool wear. Inasmuch as nozzle orifices for airless sprayers ordinarily are of quite small dimension and inasmuch as nozzle tips ordinarily are formed from relatively hard materials which are difficult to machine, the formation of single-piece nozzle tips presents a very difficult machining project.

A particular problem exists where it is desired to produce a spray pattern in which a proportionately larger quantity of the liquid is discharged in one direction than is discharged in another direction. For example, it often is desirable to provide an elongate spray pattern of relatively uniform width. Such a spray pattern is useful for spraying large, flat surfaces, for applying chemicals to crops, and for use in various fuel injecting devices. Unfortunately, it has been very difficult to produce a precision, uniform elongate spray pattern with airless sprayers due to difficulties in obtaining perfectly configured nozzle tip orifices.

Another problem with airless sprayers is that of "spitting." This is a condition wherein unacceptably large particles are discharged from the nozzle tip at the start and/or stop of a spraying operation. The tendency of some airless sprayers to spit is so severe that the use of airless sprayers for critical work has been compromised greatly. Indeed, because of this and other spray pattern deficiencies, airless sprayers often are used only for rough work, such as exterior house painting and crop spraying.

It is known to provide a single-piece nozzle tip formed from a blank made utilizing powder metallurgy techniques. The use of powder metallurgy to form blanks is advantageous in several respects. Some metals which will not alloy can be mixed and sintered to provide a hard, wear-resistant material which is well adapted for use in nozzle tips. Moreover, rapid production rates may be employed to provide blanks having a high degree of dimensional accuracy.

Where a single-piece nozzle tip blank is formed through the use of powder metallurgy techniques, a nozzle passage including a precisely configured orifice is machined into the blank by a combination of electric discharge drilling and subsequent diamond milling. The drilling and milling operations are very time consuming and expensive to carry out. Two critical centering operations must be effected during the drilling and milling process, with the result that the reject rate is high. A further deficiency of this present day technique is that the surfaces being machined are inaccessible during machining and rejects are discovered only after all of the costly machining steps are completed. Consequently, the cost of nozzle production is greatly increased due both to a high reject rate and to the fact that valuable machining time is wasted on parts which have become rejects long before the completion of machining.

While some nozzle tip manufacturers form a blank having a rough-formed passage included as part of the blank to save some machining costs, critical and expensive drilling and milling machining operations have still been deemed to be required to finish-form a majority if not all of the nozzle passage, including passage portions on both sides of a nozzle orifice. Moreover, the problem remains of rejects not being discovered until these costly operations are finished.

Perhaps a more fundamental problem encountered with all present day nozzle tip fabrication techniques is that the resultant spray patterns provided by the tips are rarely as precise as desired. With even the finest present day nozzle tips designed to produce an elongate spray pattern of uniform cross-section, the resultant pattern is almost always far less uniform in cross-section than desired. If a painting operation is being carried out, the shape of the spray pattern is such that it is difficult, if not impossible, for the operator of the spraying equipment to overlap sequential spray patterns properly on successive passes to produce a uniform coating of the liquid being sprayed. Consequently, the liquid is applied either too thick or too thin at interface regions between adjacent spray patterns. Many spraying operations have become unduly expensive due to increased operator time required to effect a satisfactory coating of articles being sprayed, excessive material application, and the number of workpieces which must be recoated to overcome coating deficiencies.

One proposal has been made to form nozzle tips from a plurality of nozzle tip parts in order to facilitate machining of the inner surface portions defining a nozzle passage. Such a proposal is presented in British Pat. No. 451,729. In accordance with the proposal described in the British patent, a nozzle tip composed of a number of parts is formed by first machining matingly engageable surfaces on the individual parts. The individual parts are then assembled and a final machining operation is performed to taper the outer surfaces of the nozzle tip parts so that the parts may be held firmly together by a suitable clamping member. Inasmuch as the nozzle tip parts ordinarily are quite small and inasmuch as clamping of these parts together for concurrently machining a taper on their outer surfaces is a difficult operation to perform, the formation of nozzle tips by this technique remains an expensive operation.

An advantage which does obtain through the formation of nozzle tips comprised of a plurality of interfitting parts is that the nozzle passage portions defined by the individual parts can be machined individually as "exterior," readily accessible surfaces using conventional tools. Since nozzle passage portions can be machined "openly" in this fashion, the resulting nozzle passage can be configured quite accurately to provide a desired spray pattern. However, even though nozzle tip parts produced in this manner may provide a greatly improved spray pattern, the technique by which the parts are fabricated results in very high fabrication costs.

A particular problem with the proposal of British Pat. No. 451,729 is that it has been deemed necessary to accurately machine a truncated cone or other tapered surface on the outer walls of the various nozzle tip parts so that, when these parts are clamped together in assembly, a clamping nut or nozzle holder may apply an appropriate and uniform force to the tapered wall portions to tightly clamp the nozzle tip parts together. Prior to the present invention, it has been deemed essential that accurately machined tapered wall portions be provided on outer surfaces of the nozzle parts. Machining the tapered wall portions is an operation which has added significantly to the cost of the resulting nozzle tip.

An approach utilized in conjunction with certain prior art nozzles to improve their spraying characteristics is that of electrostatic spraying. With this technique, an electrostatically charged region is provided forwardly of the nozzle tip at a location as close as possible to the point where atomized liquid particles are discharged from the nozzle tip. Upon passing through the charged region, the particles become charged and tend to travel in a "cloud". This electrostatic charging technique greatly minimizes overspray and tends to facilitate the provision of spray patterns having well defined edges. If a painting operation is being carried out, particles of the paint cloud may be electrostatically attracted to areas which otherwise might not receive paint.

A problem with prior art electrostatic sprayers is that it is difficult to concentrate the electrostatically charged region desirably close to the point where the liquid starts to atomize. In effect, prior electrostatic sprayers have expended much energy in the charging of a field of air surrounding the nozzle tip. Liquid particles passing through the field of charged air are charged essentially indirectly by the air rather than by direct contact with a charging electrode. Previously proposed techniques for charging an atomized spray have not been as effective as desired due mostly to the difficulties encountered in efforts to directly impart a proper charge to the spray.

SUMMARY OF THE INVENTION

The present invention overcomes the foregoing and other drawbacks of prior art proposals by providing novel and improved nozzle tip assemblies each being formed from a plurality of nozzle tip parts, and a novel and improved method of manufacturing the nozzle tip parts.

In accordance with the preferred practice of the present invention, a nozzle tip is formed from a plurality of parts. Each of the parts is fabricated from a separate blank of hard, wear-resistant material. Ceramic or powder metallurgy compositions which have been sintered are preferred. The term "sintered" is intended to include the process of forming a fused conglomerate of metal or non-metallic material to produce a substantially homogenous imporous body.

Outside surfaces of the blanks are final-formed during the sintering process. Additionally, surface portions which will form a part of a nozzle passage extending through the nozzle tip are final-formed during sintering. Mating surface portions of the nozzle tip parts and surface portions which will form the remainder of the nozzle passage are shaped by machining to assure that the nozzle tip parts will properly matingly engage each other to form a complete nozzle tip assembly having a nozzle passage of desired configuration extending therethrough.

A significant feature of the present invention lies in its utilization of such relatively rough-forming techniques as sintering to form a significant part of a nozzle passage, including converging surface portions defining the upstream side of a nozzle orifice. Whereas prior art techniques have called for surface portions on both sides of a nozzle orifice to be accurately machined, the present invention departs from prior teachings and utilizes machining only on the downstream side of a nozzle orifice. A relatively rough-forming technique such as sintering is preferably used to provide an essentially bullet-shaped upstream nozzle passage portion, while downstream nozzle passage portions are provided by machining flat surfaces which intersect the "nose" of the bullet-shaped portion to define a nozzle orifice at the junctures of the flat surfaces and the bullet-shaped passage portion.

The present invention enables critical orifice shapes including sharp edges to be formed by relatively simple machining operations and without removing the nozzle tip parts from a support jig. A very significant advantage of the process of the present invention is that the critical regions of nozzle tip parts are fully open to view during machining and can be accessed and checked after each machining pass. A potential reject can be located immediately and either corrected or disposed of so that further machining time is not wasted on an insalvagable part.

The present invention enables extremely small, precisely made nozzle tip parts to be manufactured from very hard, difficult to machine materials such as tungsten carbide steel or various ceramics. The techniques of the invention also enable production of nozzle tip parts to be carried out at very high rates. Nozzle tip parts produced in accordance with the present invention may be used in paint spraying systems, fuel injection systems, and in other applications where the nozzle passage sizes, shapes and configurations would otherwise present significant machining problems.

A feature of the invention is that it enables nozzle tip parts designed to provide relatively peculiar orifice and passage shapes to be formed relatively inexpensively. Nozzle tip assemblies capable of directing sprayed material more in one direction than another can be provided relatively easily. Nozzle tip assemblies having triangular or X-shaped orifices can be formed by using three or four nozzle tip parts. Nozzle tip assemblies having asymmetrically shaped atomizing orifices can be formed using almost any desired number of nozzle tip parts.

A further feature of the preferred practice of the present invention lies in the use of a relatively inexpensive packing member to clamp the nozzle tip parts together for proper operation. The packing member extends circumferentially about the assembled nozzle tip parts, and is confined against radially outward movement by an inner wall of a nozzle holder. The packing member is subjected to the pressure of a liquid to be discharged through the nozzle passage, and is located with respect to the nozzle tip parts such that it utilizes the pressure of the liquid to exert a clamping action on the nozzle tip parts to hold the nozzle tip parts together. Stated in another way, whereas such prior art teachings as are presented in British Pat. No. 451,729 have called for precision-machined tapered surfaces to be formed on nozzle tip parts so that these parts can be adequately clamped together by a mating nut member, the present invention preferably utilizes clamping forces developed through the action of pressurized liquid against a single packing member which surrounds the nozzle tip parts.

In one embodiment, the resilient packing member can comprise a simple O-ring. In another embodiment, the resilient packing member extends about the circumference of the assembled nozzle tip parts as an encapsulating band holding the parts together to facilitate their being inserted into, and withdrawn from, the nozzle holder as a unit.

The principles of the invention may also be used to advantage to provide an improved electrostatic spray nozzle. A thin, electrically conductive blade is preferably centered in an elongate orifice defined between or among adjacent nozzle tip parts. In its most advantageous form, the nozzle tip parts clamp the blade precisely centrally of a nozzle orifice such that liquid to be sprayed flows uniformly on either side of the blade as the liquid passes through the orifice. An electrical connection is provided for the blade internally of the assembled nozzle so that a high voltage can be applied to the blade. The blade extends forwardly of the nozzle tip and has a pointed forward end which facilitates concentrating the high voltage electrostatic charge where it will be most effective, namely in the vicinity where liquid atomization begins. Substantially only the atomized liquid, not the surrounding air, is charged. Due to boundary layer effects, the atomized liquid will tend to follow the contour of the blade and this too facilitates the formation of a very precise spray pattern.

By utilizing some or all of the features of the present invention it now is possible to utilize relatively inexpensively fabricated nozzle tip parts to produce virtually perfectly configured spray patterns of almost any desired shape including uniform, elongate spray patterns having very well defined edges and characterized by almost a complete lack of spitting.

The foregoing advantages and a fuller understanding of the invention described and claimed in the present application may be had by referring to the following description and claims taken in conjunction with the accompanying drawings.

BRIEF DESCRIPTION OF THE DRAWINGS

FIG. 17 is a view of the jig of FIG. 15 with the jig in a second machining position; and, FIG. 18 is an enlarged sectional view of the nozzle tip part of FIG. 16 after machining is completed.

DESCRIPTION OF THE PREFERRED EMBODIMENT

Figure 1:
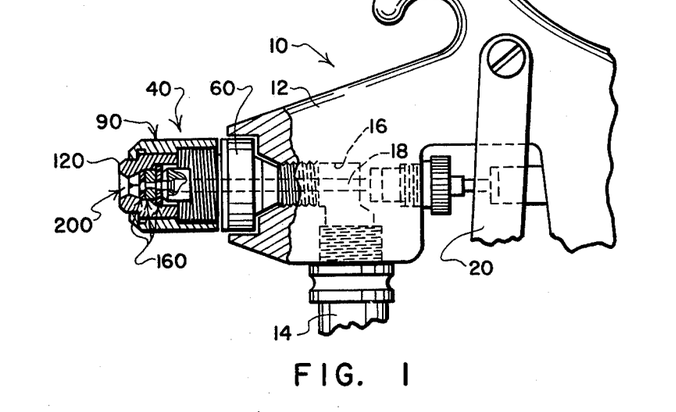
FIG. 1 is a side elevational view, with portions broken away and shown in cross-section, of a nozzle assembly embodying one form of the present invention and being mounted on an airless spray gun.

Referring to FIG. 1, a conventional airless spray gun is indicated generally by the numeral 10. The gun 10 has a main housing 12. A supply line 14 conveys pressurized liquid to the gun 10 for spraying. The supply line 14 communicates with a forwardly extending passage 16 formed in the housing 12. A valve element 18 extends axially through the passage 16 and is supported for reciprocation in the passage 16. The element 18 is biased forwardly (to the left as viewed in FIG. 1) by a spring (not shown). A trigger 20 is provided for moving the element 18 rearwardly (to the right as viewed in FIG. 1).

Figure 4:
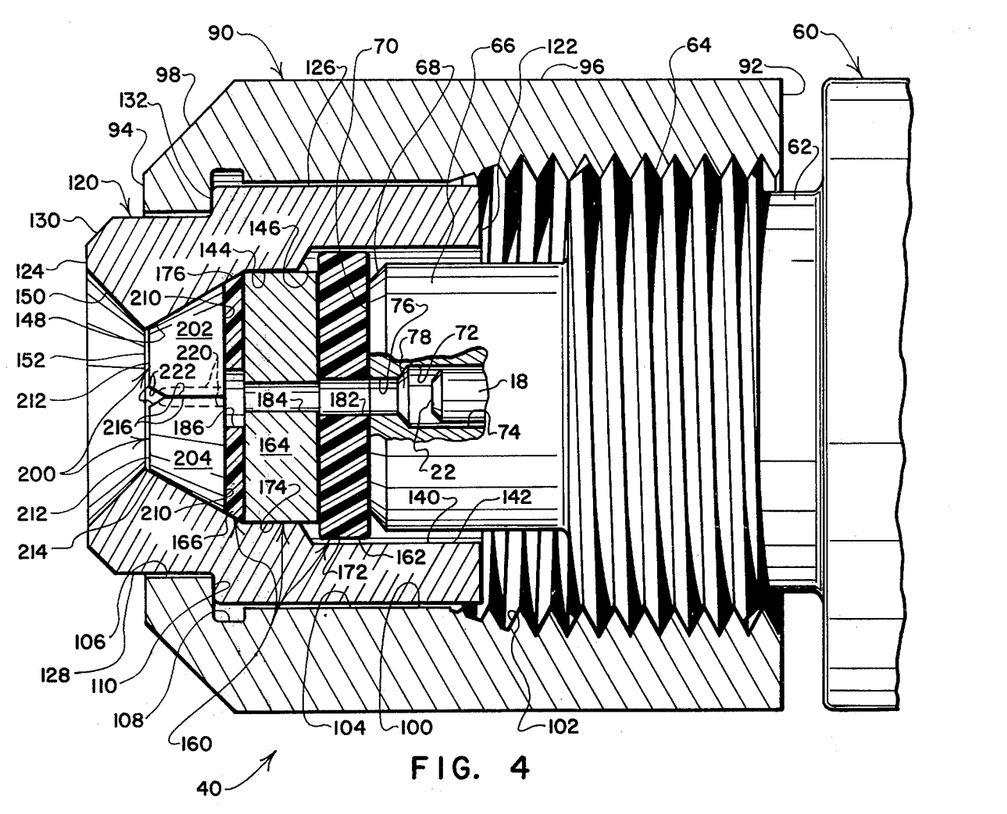
FIG. 4 is an enlarged sectional view of the nozzle assembly of FIG. 1 including nozzle tip parts having conically tapered outer wall portions.

Referring to FIGS. 1 and 4, a nozzle assembly 40 is mounted on the front of the gun 10 and is in fluid receiving communication with the passage 16. The nozzle assembly 40 principally includes an adapter 60, an outer nut 90, a nozzle tip holder 120, and a plurality of nozzle tip parts indicated generally by the numeral 200. A plurality of washer-like parts, indicated generally by the numeral 160, are housed within the outer nut 90 and serve to transmit liquid from the adapter 60 to the nozzle tip parts 200.

Referring to FIG. 4, the adapter 60 has a forwardly extending neck portion 62. A part of the neck portion 62 is threaded about its circumference, as indicated generally by the numeral 64. A forward region of the neck portion 62 is of generally cylindrical, reduced diameter configuration, as indicated by the numeral 66. The forward end of the neck portion 66 is provided with a chamfer 68 and with a flat polished end surface 70.

A passage indicated generally by the numeral 72 is provided through the adapter 60. The passage 72 has a relatively large diameter portion 74 which communicates with the passage 16 and extends substantially the entire distance through the adapter 60. The passage 72 has a relatively short, smaller diameter portion 76 located near the forward end of the adapter 60 and opening through the end surface 70. A tapered valve seat 78 provides a transition between the relatively large and smaller diameter portions 74, 76.

The valve element 18 has a forward end 22 which may be brought into seating engagement with the valve seat 78 when it is desired to stop the flow of liquid through the spray gun 10. The valve element end 22 is normally biased into engagement with the valve seat 78 to prevent liquid flow through the gun 10. When the valve element end 22 is moved away from the seat 78 by manual actuation of the trigger 20, liquid will flow through the supply line 14, into the gun housing 12, through the aligned passages 16, 72 and through the nozzle assembly 40 for discharge.

The outer nut 90 has a rearward end wall 92, a forward end wall 94, and a generally cylindrical, knurled outer wall 96. A tapered nose portion 98 interconnects the forward end of the outer wall 96 and the forward end wall 94. A passage 100 is formed through the nut 90. The passage 100 has a threaded rear region 102, a generally cylindrical central region 104, and a reduced diameter forward region 106. A relief groove 108 is formed near the juncture of the central and forward regions 104, 106. A radially extending shoulder 110 is provided at the forward side of the groove 108.

The nozzle tip holder 120 is positioned principally within the central and forward regions 104, 106 of the passage 100. The holder 120 has a rearward end wall 122, a forward end wall 124, a generally cylindrical rearward outer wall portion 126 and a relatively smaller diameter, generally cylindrical forward outer wall portion 128. A tapered nose 130 interconnects the forward end of the outer wall portion 128 and the forward end wall 124. A radially extending shoulder 132 provides a transition between the outer wall portions 126, 128. The rearward outer wall portion 126 slip-fits within the central passage portion 104. The forward outer wall portion 128 slip-fits within the forward passage portion 106. The shoulder 132 abbuttingly engages the shoulder 110.

A passage 140 is formed through the nozzle tip holder 120. The passage 140 has a relatively large diameter rearward region 142, a generally cylindrical, reduced diameter central region 144, and a converging tapered wall portion 146 which provides a transition between the rearward and central regions 142, 144. A converging tapered region 148 and a diverging tapered region 150 interconnect the central region 144 with the forward end wall 124. The tapered portions 148, 150 cooperate to define a restricted diameter opening 152 at their juncture.

The washer-like parts 160 include rearward, central and forward members 162, 164, 166. The rearward member 162 is formed from a synthetic material such as nylon (or other materials such as are sold under the trademark DELRIN) and has an outer wall 172 configured to slip-fit within the rearward region 142. The rearward member 162 is sufficiently deformable, under pressure, to provide good sealing engagement between the adapter end wall 70 and the central member 164. The central member 164 is formed from metal and has an outer wall 174 configured to press-fit within the central region 144. The forward member 166 is formed from a resilient material and has a tapered outer wall portion 176 configured to be received within the tapered region 148. The forward member 166 is sufficiently deformable, under pressure, to provide good sealing engagement between the central member 164 and the nozzle parts 200. Aligned passages 182, 184, 186 are formed through the members 162, 164, 166 to communicate the forward region 76 of the passage 72 with the nozzle tip parts 200.

Figure 5:
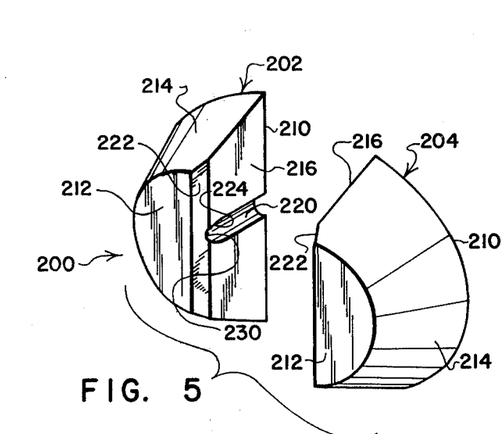
FIG. 5 is an exploded perspective view of the nozzle tip parts of FIG. 4.
Figure 6:
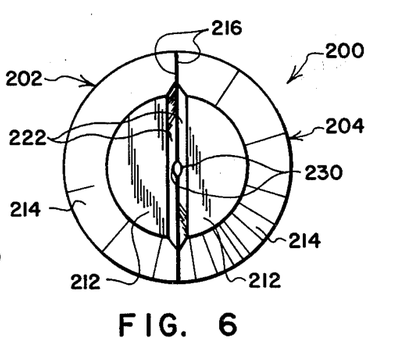
FIG. 6 is an end elevational view of the nozzle tip parts of FIG. 4, the parts being shown in assembled mating configuration.

The nozzle tip parts 200 include two identical parts 202, 204. Referring to FIGS. 4-6, each of the nozzle tip parts 202, 204 has a rearward end wall 210, a forward end wall 212, a tapered outer wall 214, and a generally flat inner wall 216. A nozzle passage portion 220 is formed in each of the inner walls 216. Each of the parts 202, 204 has an inclined flat surface 222 which provides a transition between its forward end wall 212 and its inner wall 216. An orifice portion 230 is defined where the passage portion 220 opens through the flat surface 222.

Each of the nozzle parts 202, 204 is formed of a hard wear-resistant material such as sintered tungsten carbide steel or a sintered ceramic. The rearward end wall 210, the forward end wall 212, and the tapered outer wall 214 are final-formed during the sintering process, as is the nozzle passage portion 220. Sintering processes, per se, are already known in the art and further discussion regarding the parameters of the basic process utilized need not be described here. Blanks produced by the sintering process are sufficiently dimensionally precise that further machining is not required to finish any of the walls 210, 212, 214 or the passage portion 220. Machining of the inner wall 216 and of the flat surface 222 is accomplished through the utilization of a suitable jig, as will be discussed in greater detail in conjunction with FIGS. 15-18.

The nozzle passage portion 220 formed during the sintering process is of generally bullet-shape. The passage portion 220 opens through the rearward end wall 210 and extends forwardly, stopping short of the forward end wall 212. A rounded end region or "nose" 224 is provided at the forward terminus of the nozzle passage portion 220. When the flat surface 222 is machined, the machining process is conducted to a depth which is sufficient to form the orifice portion 230 at the juncture of the flat surface 222 and the nozzle passage portion 220. The two machining operations which are carried out to smooth the inner wall 216 and to form the flat surface 222 are critical to the formation of a good nozzle tip part but, as will be explained in greater detail, can be performed relatively easily while within full view.

The nozzle tip parts 202, 204 are positioned, when assembled, with their tapered outer walls 214 in surface-to-surface bedding engagement with the tapered inner surface portion 148 of the holder 120. The rearward end walls 210 of the parts 202, 204 engage the resilient member 166. The nozzle passage portions 220 and the flat surfaces 222 cooperate to define a nozzle passage which extends through the nozzle tip assembly from the rearward end walls 210 to the forward end walls 212, and which communicates with the opening 186 formed in the member 166.

When the nozzle parts 102, 104 are assembled as shown in FIGS. 4 and 6, the inner walls 216 are in abutting, surface-to-surface relationship. If a painting operation is being carried out, the paint particle size is much larger than any irregularities which may be present in the inner wall surfaces 216, so no leaking of paint is possible. For other liquids, leakage which might tend to be caused by the presence of surface irregularities in the mating surfaces 216 can be overcome by providing a very thin layer of insoluble gasketing compound between the mating surfaces 216. Alternatively, the assembled nozzle parts 102, 104 may be encapsulated, during which process the mating inner walls 216 are sealed.

The orifice 230 defined by the orifice portions 230 may be made sufficiently precise and sharp-edged that the liquid particles will be atomized to produce a uniform particle density spray and to facilitate the formation of a spray pattern having very precisely defined boundaries. The orifice portions 230 cooperate to form an orifice of elongate generally elliptical configuration, as is best seen in FIG. 6. The upstream or rearward side of the orifice is defined by the rounded end region or "nose" 224 of the rough-formed passage portions 220. The downstream or forward side of the orifice is defined by the flat surfaces 222. As will be explained in greater detail in conjunction with the discussion of FIGS. 15-18, the flat surfaces 222 are machined carefully so that the orifice portions 230 will provide an orifice of exactly the desired size and shape.

A drawback of the nozzle tip part configuration used in the embodiment of FIGS. 4-6 is that the nozzle tip parts 202, 204 are clamped together by a wedging action which results from engagement between the mating tapered surfaces 148, 214. Accurate relative positioning and good clamping of the nozzle tip parts 202, 204 depends, to a degree, on the degree of precision with which the nozzle part surfaces 214 and the nozzle holder surface 148 are formed. This drawback is overcome in the more preferred embodiments of FIGS. 7-9 and FIGS. 10-11, where, as will be explained, the nozzle tip parts do not have tapered surface portions which must matingly engage tapered surfaces of a nozzle holder.

Figure 7:
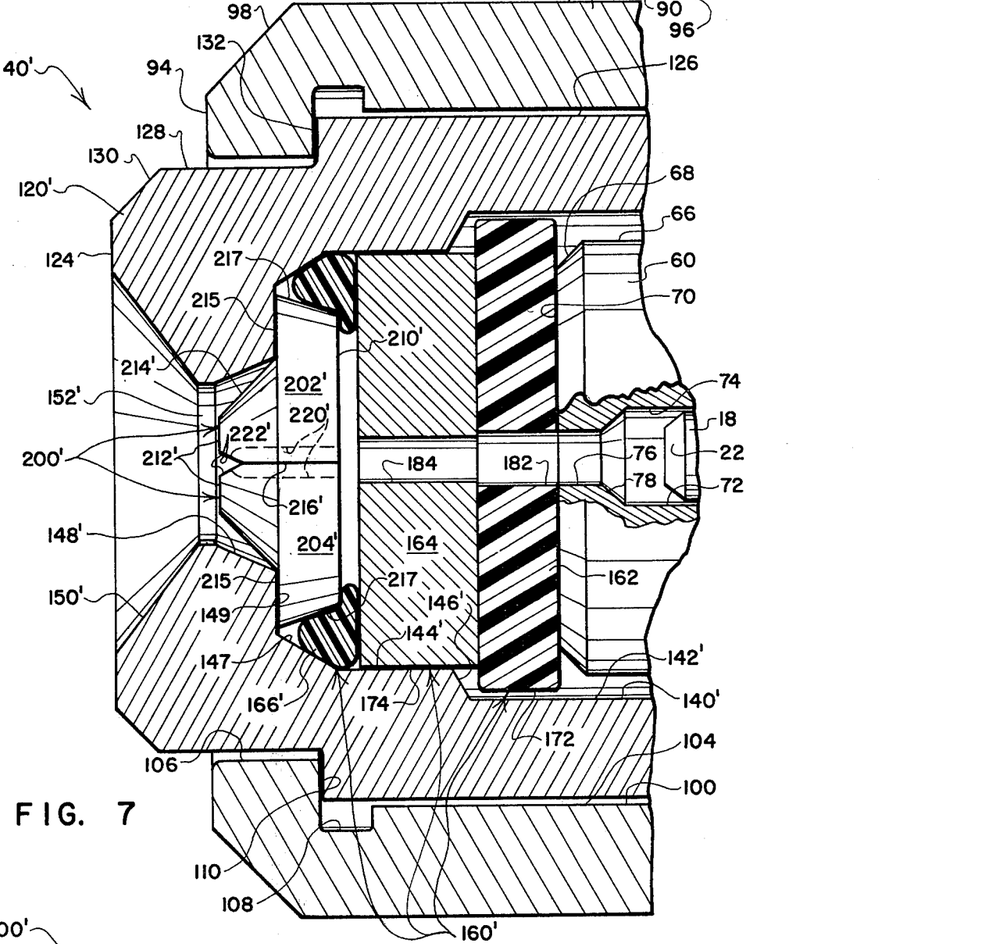
FIG. 7 is an enlarged, sectional view of a more preferred nozzle assembly according to the invention including nozzle tip parts having tapered outer wall portions circumferentially surrounded by a packing member.
Figure 8:
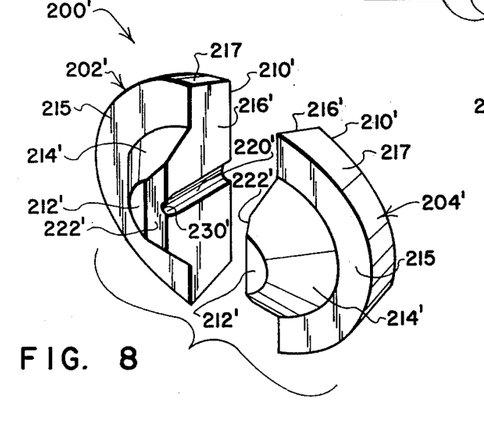
FIG. 8 is an exploded perspective view of the nozzle tip parts of FIG. 7.
Figure 9:
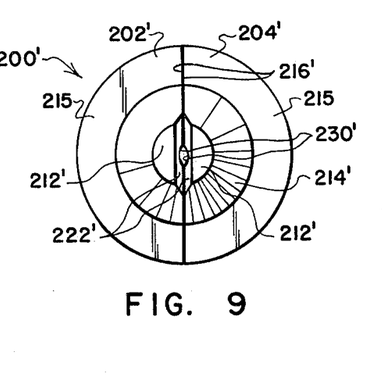
FIG. 9 is an end elevational view of the nozzle tip parts of FIG. 7, the parts being shown in assembled mating configuration.

A more preferred embodiment of the invention is shown in FIGS. 7-9. Since a majority of the components of this embodiment find similar if not identical counterparts in the previously described embodiment, the same reference numerals as used previously are used once again where appropriate. Where the reference numerals used in FIGS. 7-9 are exactly the same as reference numerals used in FIGS. 4-6, these numerals refer to parts or features of exactly identical construction to those described previously. Where reference numerals used in FIGS. 7-9 bear a "prime mark", they refer to parts or features which correspond to but which are somewhat differently configured than those described previously. Where entirely new reference numerals are used in FIGS. 7-9, these refer to entirely new parts or features. This system of using identical and corresponding reference numerals is also adhered to in conjunction with the embodiment of FIGS. 10-11 (where double-prime marks are used) and in conjunction with the embodiment of FIG. 12 (where triple-prime marks are used).

Referring to FIGS. 7-9, the adapter 60 and the outer nut 90 employed in the nozzle assembly embodiment 40' are identical to the previously described components 60, 90. The nozzle holder 120' differs from the nozzle holder 120 in the configuration of its internal passage 140'. The passage 140' has a relatively large diameter rearward region 142', a generally cylindrical, reduced diameter central region 144', and a converging tapered wall portion 146'. Converging and diverging regions 148' and 150' are located near the forward end of the holder 120' and are interconnected by a cylindrical wall 152'. A tapered wall portion 147 and a radially extending shoulder 149 interconnect the central region 144' and the tapered region 148'.

The washer-like parts 160' include rearward and central members 162, 164 which are identical to the previously described members 162, 164. The member 166', however, comprises a resilient O-ring which extends perimetrically about outer wall portions of the nozzle parts 202', 204'. The O-ring 166' is acted upon by the pressure of fluid being sprayed through the nozzle assembly 40', and is caused to wedgingly clamp the nozzle tip parts 202', 204' together.

Referring to FIGS. 7-9, the nozzle tip parts 202', 204' are identical one with another. Each of the parts 202', 204' has a rearward end wall 210', a forward end wall 212', a tapered outer wall portion 214', a radially extending outer wall shoulder 215, a tapered outer wall portion 217, and a generally flat inner wall 216'. A nozzle passage portion 220' is formed in each of the inner walls 216'. Each of the parts 202', 204' has an inclined flat surface 222' which proves a transition between its forward end wall 212' and its inner wall 216'. An orifice portion 230' is defined wherein the passage portion 220' opens through the flat surface 222'.

The nozzle tip parts 202', 204' are positioned, when assembled, with their tapered outer wall portions 214' extending loosely through the region defined by the tapered nozzle holder surface 148'. The radially extending shoulder 215 abuttingly engages the radially extending shoulder 149. The tapered outer wall portion 217 cooperates with the tapered surface 147 to define an annular groove of generally V-shaped cross section for receiving the O-ring 166'. As is best seen in FIG. 7, when the O-ring 166' is subjected to fluid pressure, the majority of its mass is wedged, by the fluid pressure forces, into a substantially triangular-shaped space defined by the forward face of the washer-like member 164, and the tapered walls 147, 217. As the O-ring 166' is wedged into the space between the tapered walls 147, 217, it is caused to clampingly engage the nozzle parts 202', 204' and to not only clamp these parts together but also to securely hold the nozzle parts 202', 204' with their radially extending shoulders 215 in firm engagement with the radially extending shoulders 149.

An advantage of the nozzle assembly embodiment 40' is that the nozzle parts 202', 204' do not rely on mating engagement of tapered surface portions on their outer walls with a corresponding tapered surface portion on a nozzle holder to effect clamping engagement of the nozzle parts. Instead, the nozzle parts 202', 204' engage the nozzle holder 120' only in the vicinity of the radially extending shoulder 149 and rely on the fluid-pressurewedging action of the packing member or O-ring 166' to effect clamping.

Figure 10:
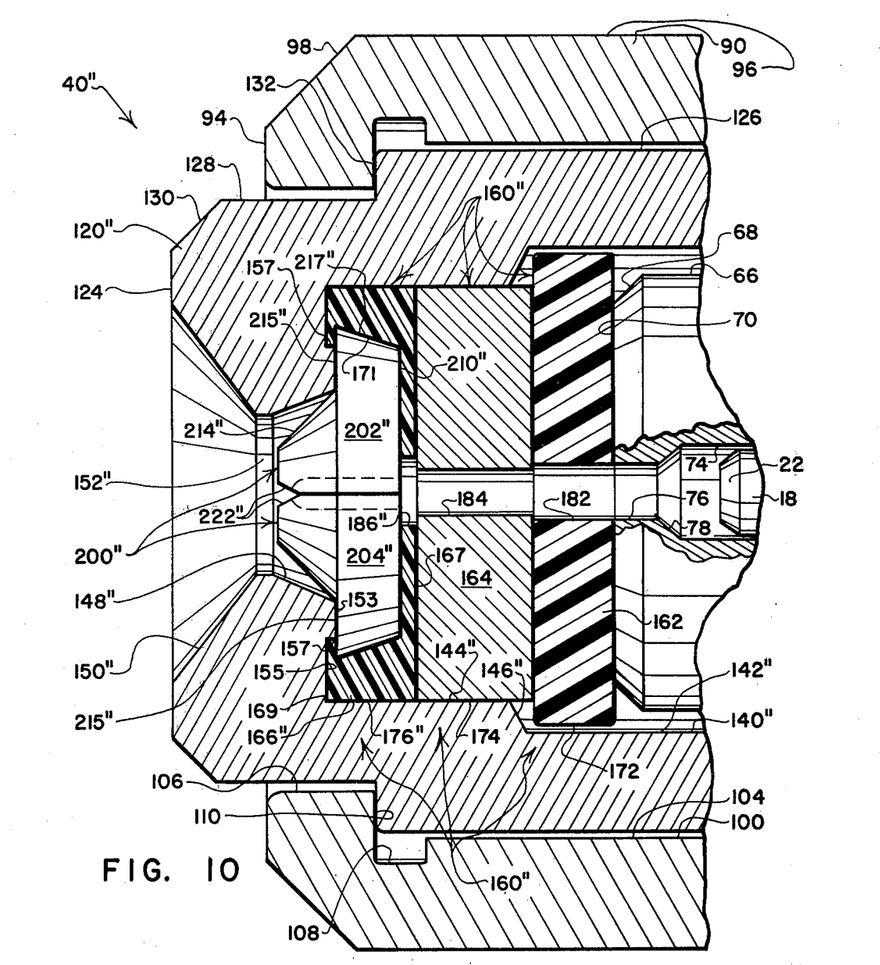
FIG. 10 is an enlarged, sectional view of a more preferred nozzle assembly according to the invention including nozzle tip parts encapsulated in a circumferentially extending packing member.
Figure 11:
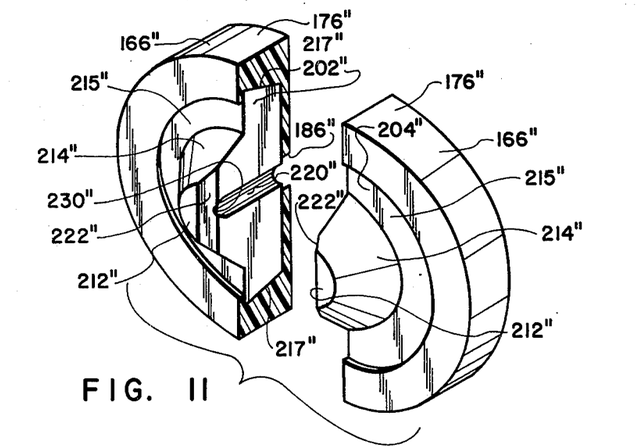
FIG. 11 is an exploded perspective view of the nozzle tip parts of FIG. 10.

Referring to FIGS. 10-11, an even more preferred nozzle assembly embodiment is indicated generally by the numeral 40". The adapter 60 and the outer nut 90 used in this embodiment are identical to the previously described components 60, 90. The nozzle holder 120" differs from the nozzle holder 120' in the configuration of its internal passage 140". The passage 140" has a relatively large diameter rearward region 142", a generally cylindrical reduced-diameter central region 144", and a converging tapered wall portion 146". Converging and diverging regions 148" and 150" are located near the forward end of the holder 120" are interconnected by a cylindrical wall 152". A pair of radially extending shoulders 153, 155 are interconnected by an undercut shoulder 157.

The washer-like parts 160" include rearward and central members 162, 164 which are identical to the previously described members 162, 164. The member 166", however, comprises a resilient member having an outer wall portion 176" which snugly engages the cylindrical inner wall surface 144" of the holder 120". The resilient member 166" has a rearward wall surface 167 which engages the forwardly facing wall of the central member 164. The member 166" has a forward wall surface 169 which engages the radially extending shoulder 155. The member 166" has a tapered inner wall surface 171 which surrounds the entire periphery of the tapered outer wall portion 217" of the assembled nozzle parts 202", 204".

Referring to FIGS. 10 and 11, the nozzle tip parts 202", 204" are substantially identical in configuration with the nozzle tip parts 202', 204' but are slightly smaller in size than the nozzle tip parts 202', 204'. The resilient member 166" serves to encapsulate the nozzle tip parts 202", 204" and to hold these parts in assembled configuration for insertion into and withdrawal from the nozzle tip holder 120". Additionally, the member 166" operates advantageously in substantially the same manner as the O-ring 166' to effect a wedging-type clamping of the nozzle tip parts 202", 204" as the result of fluid pressure forces being applied to the walls of its inner passage 186".

The packing member 166" may be formed from any of a variety of conventional synthetic materials such as polyvinylchloride, nylon, rubber compounds and the like. The resilient character of the material used to form the member 166" enables this material to be compressed under the action of fluid-pressure-forces whereby the nozzle tip parts 202", 204" are caused to be wedgingly clamped by the packing member 166.

A feature of all of the nozzle assembly embodiments described is that clamping of the nozzle tip parts is effected, at least in part, by the pressure of the fluid being sprayed. Moreover, the outer nuts 90 used in each of the embodiments need be tightened only finger-tight on their adapters 60. Once liquid under pressure is admitted to any of these nozzle assemblies, the resilient elements 166, 166', 166" lying near the nozzle parts 202, 204, 202', 204', 202", 204" are compressed into engagement with the nozzle tip parts thereby causing the nozzle tip parts to be wedgingly clamped together. The finger-tight installation feature is important because it facilitates disassembly and reassembly for cleaning and for changing nozzle tip parts to provide spray patterns of different types.

Figure 12:
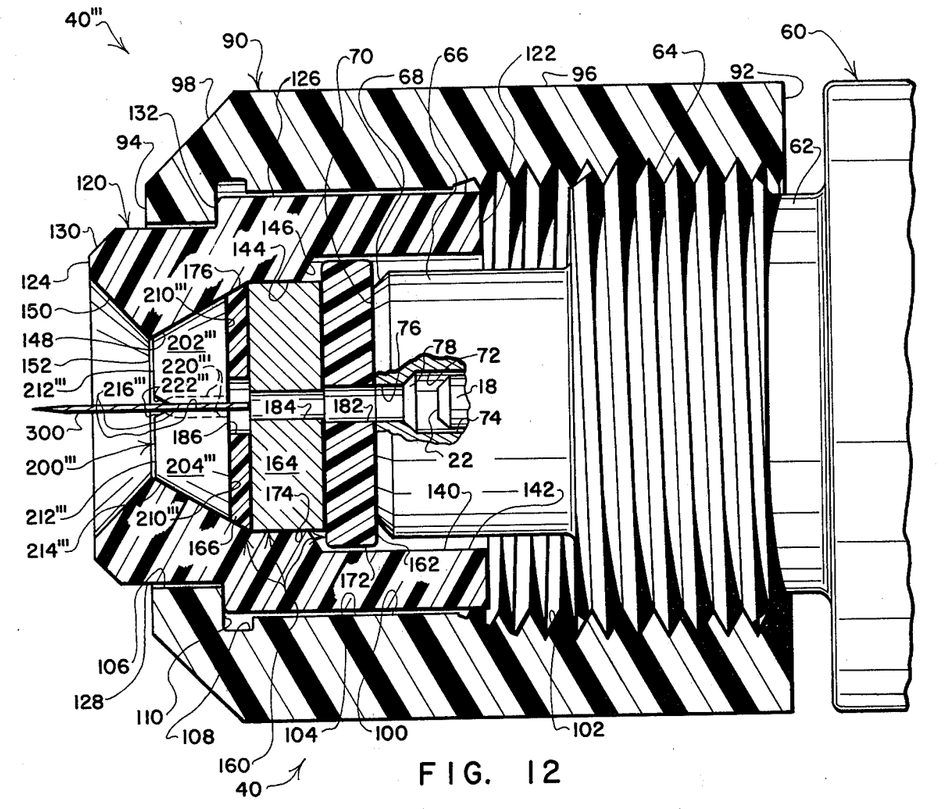
FIG. 12 is an enlarged, sectional view of an alternative nozzle assembly according to the invention including nozzle tip parts having conical outer wall portions being compressed by a packing member and clamping an electrically conductive charging blade.

Referring to FIG. 12, still another nozzle assembly embodiment is indicated generally by the numeral 40'''. In the embodiment 40''', the adapter 60, the outer nut 90, the nozzle tip holder 120, and the washer-like parts 160 are configured identically with those described previously. The nozzle assembly 40''' differs from the embodiment 40 principally in that: (1) some of its components are formed from non-electrically conductive materials; (2) the nozzle passages 220 formed in the nozzle tip parts 202''', 204''' are somewhat shallower than those provided in the nozzle tip parts 202, 204; and, (3) an electrically conductive blade 300 is clampingly engaged between the nozzle tip parts 202''', 204'''.

Figure 13:
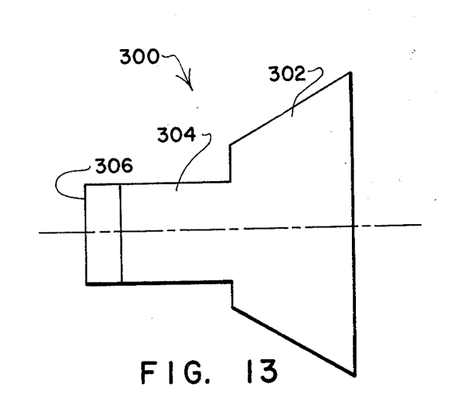
FIG. 13 is a side elevational view of one charging blade configuration.

Referring to FIGS. 12 and 13, the electrically conductive blade 300 is a thin, elongate, current-carrying member which is clamped between the inner walls 216''' of the nozzle parts 202''', 204'''. The blade 300 extends forwardly of the nozzle tip parts 202''', 204''' and is positioned substantially centrally of the nozzle passage orifice defined by the nozzle tip parts 202''', 204'''. As liquid discharges through the nozzle tip orifice, liquid flows in small streams on either side of the blade 300 and tends to cling to the blade 300 until it reaches the vicinity of the blade's forward end. As the liquid is atomized, it is charged by an electric potential applied to the blade 300. Such a potential may be applied to the blade 300 internally of the nozzle assembly 40''' by means of an internal electrical connection (not shown).

Figure 14:
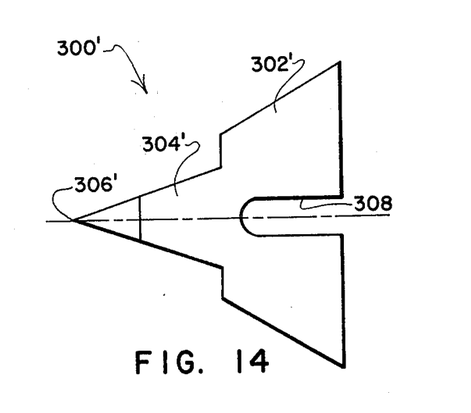
FIG. 14 is a side elevational view of a preferred charging blade configuration.

Referring to FIGS. 13 and 14, the blade 300 may take several forms. The form illustrated in FIGS. 12 and 13 includes a generally trapezoidal-shaped base portion 302 adapted to be clamped between the inner walls 216''' of the nozzle tip parts 202''', 204''', and an elongate generally rectangular-shaped portion 304 adapted to extend forwardly of the nozzle tip parts 202''', 204'''. A sharpened edge 306 is provided at the forward end of the blade 300.

In the embodiment of FIG. 14, an alternate blade configuration is indicated generally by the numeral 300'. The blade 300' includes a generally trapezoidal-shaped base portion 302' and a triangular-shaped forwardly extending portion 304' which terminates in a pointed nose 306'. A U-shaped passage portion 308 is formed in the base portion 302' and cooperates with the nozzle passage portions 220''' to facilitate the delivery of liquid to the vicinity of the orifice defined by the nozzle tip parts 202''', 204'''.

Either of the described embodiments of the blades 300, 300' function effectively to charge liquid particles being discharged through an associated nozzle assembly. While no means for making an electrical connection with either of the blades 300, 300' is shown, in the conventional means of delivering electrical potential through conductive elements to the blades 300, 300' may be used. In order to achieve maximum operating efficiency, as many of the parts of the assembly 40"40 as possible are made from non-electrically conductive materials. As illustrated in FIG. 12, the outer nut 90, the nozzle tip holder 120, and other nozzle components are made of a plastics material. Maximum operating efficiency is obtained if the nozzle tip parts 202''', 204''' are formed of a ceramic material, rather than a sintered metallic material.

A feature of the electrostatic nozzle assembly 40''' is that it is particularly effective to charge liquid particles because the charging action takes place directly in the vicinity where the liquid atomizes. Accordingly, the liquid particles themselves, rather than the air surrounding the particles, are charged.

A feature of the nozzle tip parts utilized in each of the four described nozzle assembly embodiments 40, 40', 40'', 40''' is that the only machining which needs to be done to complete the formation of these parts from blanks after the blanks have been formed in a sintering operation is to smooth their inner wall surfaces 216, 216', 216'', 216''' and to form the flat surfaces 222, 222', 222'', 222'''. A further feature of the nozzle tip parts of the described embodiments is the ease with these two machining operations can be carried out. A preferred technique for carrying out these two minor machining operations is illustrated somewhat schematically in FIGS. 15–18.

Figures 15, 16:
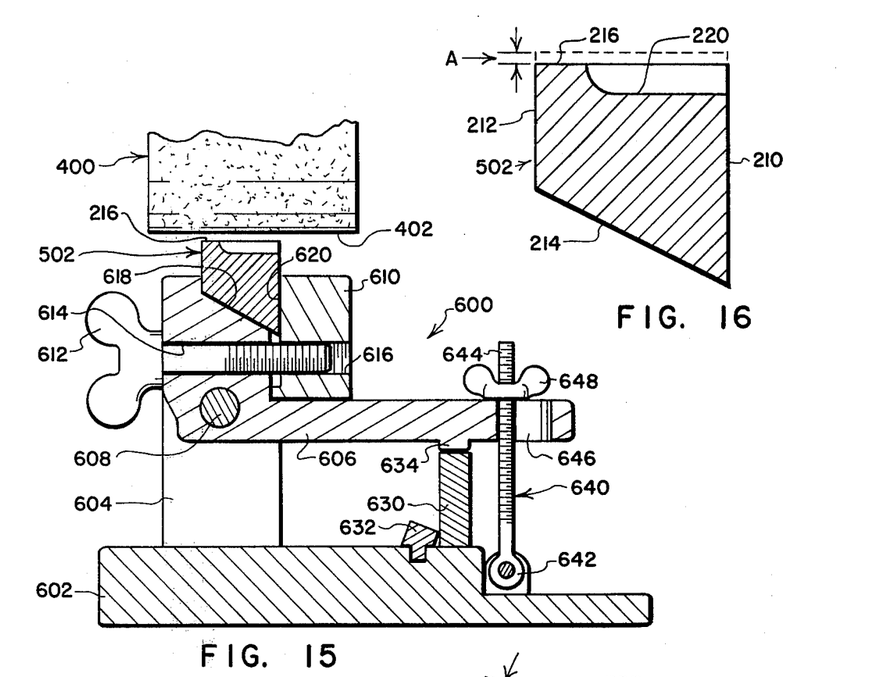
FIG. 15 is somewhat schematic view, largely in cross-section, of a jig employed in accordance with the invention to machine the nozzle tip parts, the jig being shown in a first machining position.
FIG. 16 is an enlarged sectional view of a partly machined nozzle tip part.
Figures 17, 18:
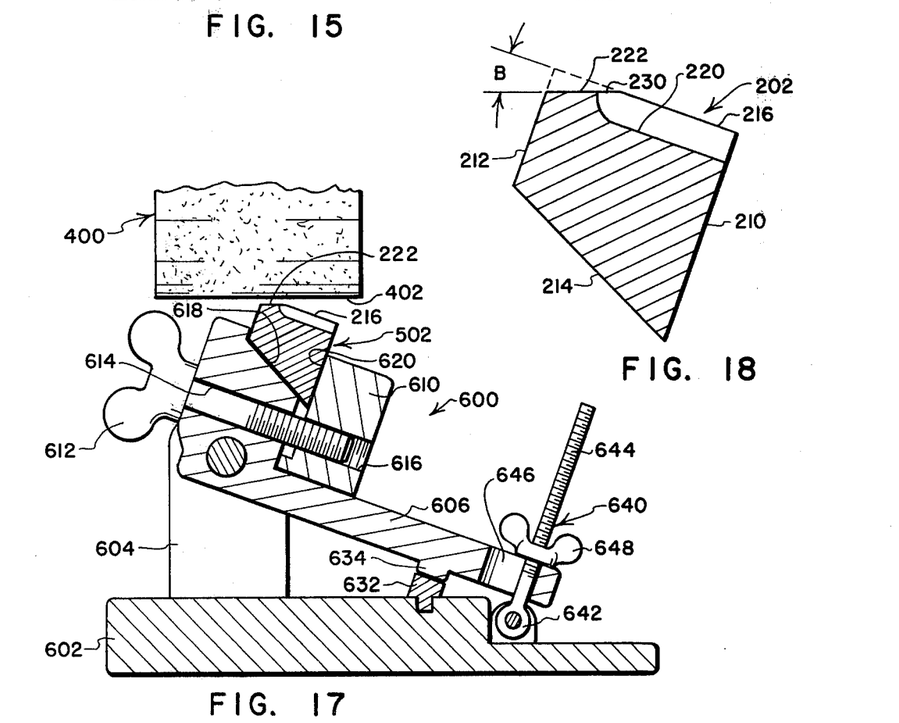

Referring to FIGS. 15 and 17, a generally cylindrical grinding wheel is indicated generally by the numeral 400. The grinding wheel 400 has a generally cylindrical outer surface indicated by the numeral 402. A nozzle part blank to be machined is indicated generally by the numeral 502. The blank 502 is to be machined in two separate operations by the grinding wheel 402 in order to form the previously described nozzle tip part 202.

A jig for supporting the blank 502 is indicated generally by the numeral 600. The jig 600 has a base 602, an upstanding support 604, and a generally L-shaped bracket 606. The bracket 606 is pivotally supported on the upstanding bracket 606 by a shaft 608. A jaw member 610 is movably supported on the L-shaped bracket 606. A wing-head threaded fastener 612 extends through a hole 614 formed in the bracket 606 and is threaded into an aligned hole 616 formed in the jaw member 610.

Appropriately configured surfaces 618, 620 are provided on the bracket 606 and the jaw member 610 for matingly receiving the blank 502. When the threaded fastener 612 is tightened, the blank 502 is securely clamped between the bracket 605 and the jaw member 610 for machining by the grinding wheel surface 402.

The orientation of the bracket 606 relative to the base 602 is adjustable to selectively position the blank 502 for successive machining operations. The blank 502 is positioned for smoothing of its inner surface 216 by means of a spacer 630 interposed between the base 602 and an arm of the bracket 606, as shown in FIG. 15. The blank 502 is positioned for machining of the flat surface 222 by pivoting the bracket 606 to the position shown in FIG. 17 wherein mating abutments 632, 634 carried on the base 602 and on the bracket 606 are brought into abutting engagement.

A threaded fastener 640 has a head portion 642 pivotally connected to the base 602. The fastener 640 has a portion 644 which extends upwardly through a slot 646 formed in the bracket 606. A wing nut 648 is threaded onto the portion 644 and may be tightened by hand to secure the bracket in either of the positions shown in FIG. 15 and 17.

With the nozzle tip blank 502 positioned for a first machining operation as shown in FIG. 15, a portion of its inner wall surface 216, as designated by the letter "A" in FIG. 16, is ground off by the rotating grinding wheel 402. Once the inner wall surface 216 has been smoothed in this manner, the bracket 606 is positioned as shown in FIG. 17 to support the blank 502 in a second attitude for further machining. The rotating grinding wheel 400 is then utilized, once again, to form the flat surface 222 by removing a portion of the blank as indicated by the letter "B" in FIG. 18. During formation of the flat surface portion 222, a careful check is made of the size and shape of the orifice portion 230 being formed at the juncture of the flat wall portion 222 and the passage portion 230. Machining of the flat surface 222 is continued to a depth where exactly the right-size orifice portion 230 is formed. If, during machining, it becomes apparent that the configuration of the nozzle passage portion 220 which has been formed relatively roughly during a sintering process does not have the exact desired configuration, whereby the resulting orifice 230 will be imperfect, the nozzle blank 502 may be discarded immediately and no further machining time is wasted in an effort to salvage it.

While a fairly simple jig 600 having relatively crude components has been illustrated in FIGS. 15 and 17, it will be readily apparent to those skilled in the art that more efficient, easy to use jig systems can be employed to further facilitate the positioning of a nozzle blank in two distinct attitudes for separate machining processees without requiring the nozzle tip blank to be removed from the jig until machining has been completed.

A significant advantage of the method of the present invention is that the surfaces of the nozzle tip blanks being machined are oriented vertically upwardly during machining and are fully exposed to view during the machining process. A microscope may be positioned at one side of the grinding wheel 400 in close proximity to the area of operation of the grinding wheel to facilitate ready inspection of the nozzle tip parts being machined. The nozzle tip part may be inspected visually as often as desired, even after each of the series of successive passes of the grinding wheel 400. The simplicity of this system enables perfectly finished nozzle tip parts to be machined literally in seconds, with considerable decrease in the number of expensive rejects produced by prior machining methods, and with minimal machine tool wear. Perfectly formed nozzle tip parts can now be manufactured from the hardest, most difficult-to-machine materials and yet the manufacturing process can be carried out faster and less expensively than has heretofore been possible. Orifices as small as 0.001 inch across may be formed easily and accurately.

Figure 2:
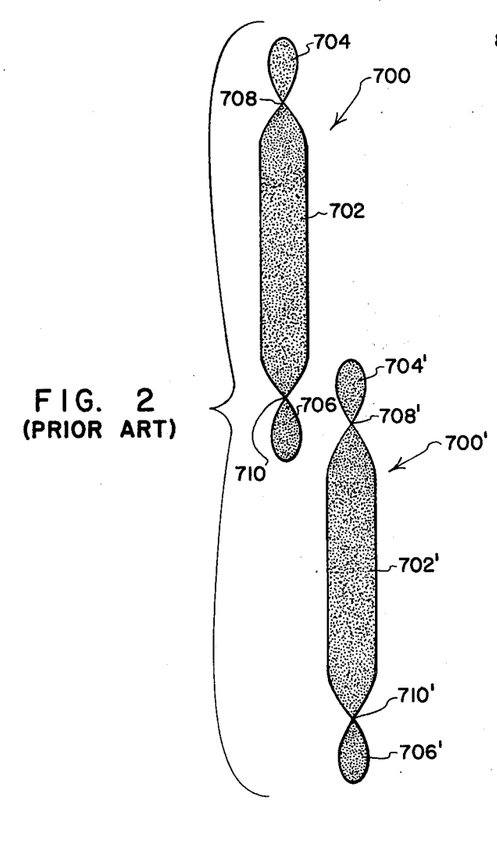
FIG. 2 is a schematic representation of typical elongate spray patterns produced by spray guns having prior art nozzles.
Figure 3:
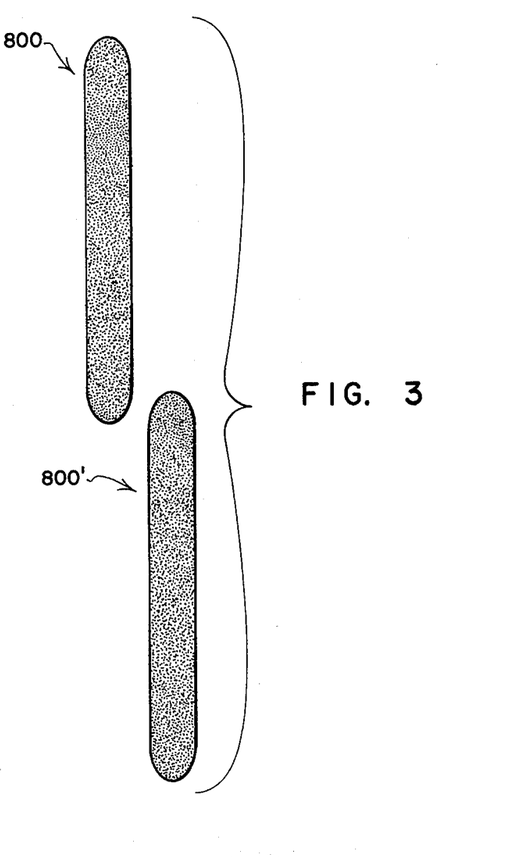
FIG. 3 is a schematic representation of typical elongate spray patterns produced by a nozzle embodying the preferred practice of the present invention.

Referring to FIGS. 2 and 3, still another feature of the present invention lies in the improved spray pattern configuration which may be obtained as a result of the perfectly configured nozzle parts produced in accordance with the method of the present invention. These FIGURES present a somewhat schematic comparison of the types of elongate spray patterns obtained through the use of nozzle tips of the prior art and those embodying the present invention.

Referring to FIG. 2, a typical elongate spray pattern obtained with a prior art nozzle is indicated generally by the numeral 700. The spray pattern 700 has a generally cigar-shaped central region 702 and a pair of tear-shaped end regions 704, 706. The end regions 704, 706 are almost entirely detached from the central region 702 in areas of constriction indicated by the numerals 708, 710. While the nozzle tip which produces the spray pattern 700 is intended to produce a single elongate cigar-shaped pattern, difficulties encountered in precisely forming the nozzle tip tend to cause the constricted regions 708, 710 and the tear-shaped end regions 704, 706 to be formed at opposite ends of a cigar-shaped central region.

When a nozzle producing the spray pattern 700 is swung from left to right, as viewed in FIG. 2, the resulting coating application will tend to be of non-uniform character. Very little coating will be applied where the constricted areas 708, 710 pass over the workpiece being sprayed. Non-uniformity will also be noticeable in the coating portions which result from end regions of the spray pattern. When successive passes of a spray gun are needed to coat a relatively large workpiece area, an experienced operator will attempt to overlap successive applications such that the tear-shaped end region 704' of a second-applied spray pattern 700' serves to fill in the deficient paint application resulting from the constricted area 710 of a first applied spray pattern 700. The sort of overlap utilized by experienced operators is intended to be illustrated by the schematic presentations of overlapping spray patterns 700, 700' in FIG. 2.

As will be appreciated by those skilled in the art, there is no way the results of the spray patterns 700, 700' can be overlapped to produce a genuinely uniformly coated end product. Moreover, unless successive spray patterns are very precisely overlapped, extremely non-uniform coatings will surely result.

In FIG. 3, the numerals 800, 800' indicate two of the very desirable types of elongate, cigar-shaped spray patterns which can be produced utilizing nozzle tip parts embodying the present invention. The degree to which these successively produced patterns need to be overlapped to provide a relatively uniformly coated workpiece is a matter which can be easily understood and carried out by even the least experienced operator. Accordingly, nozzles utilizing the present invention tend to make the production of uniform coatings easier than has been the case with prior art nozzles. Moreover, the perfectly configured nozzle parts produced utilizing techniques of the present invention not only produce an improved spray pattern configuration but also have been found to exhibit a markedly decreased tendency to "spit" at the start and/or stop of spraying operations.

While the nozzle tip assemblies shown in the drawings each utilize two identical nozzle tip parts, it will be apparent to those skilled in the art that the principles of the present invention can be used to provide nozzle tips formed from substantially any number of parts, and that the nozzle tip parts utilized in a particular nozzle assembly need not be identical one with another. The principles of the present invention may be utilized to form nozzle tips having very unique and unusual passage and orifice configurations.

Although the invention has been described in its preferred form with a certain degree of particularity, it is understood that the present disclosure of the preferred embodiments has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A method of forming nozzle tip parts for a plural-part nozzle tip, comprising the steps of:
   (a) forming a plurality of blanks from which nozzle tip parts will be formed, each blank including a forward wall, a rearward wall, and inner wall and outer walls, the step of forming blanks being carried out by sintering bodies of hard, wear-resistant material, the forward, rearward and outer walls being final-formed during the sintering process, the step of forming blanks further including machining at least a portion of the inner wall of each of the blanks to provide the nozzle tip parts with smooth, matingly engageable surface portions;
   (b) forming a nozzle passage portion during the sintering process in the inner wall of at least a selected one of the blanks, the nozzle passage portion extending from the rearward wall toward the forward wall and terminating in an end formation;
   (c) machining at least one flat surface on the selected blank near the juncture of its forward wall and its inner wall, the plane of the flat surface being oriented to intersect the end formation of the nozzle passage portion;
   (d) the configuration of the end formation and the orientation of the plane of the flat surface being selected such that an orifice portion of desired configuration is formed at their juncture, and such that when the blanks are assembled with certain of their inner walls in mating engagement, a plural-part nozzle tip is provided having a nozzle passage of desired configuration extending therethrough from the rearward walls to the forward walls of the nozzle tip parts with the nozzle passage portions and the flat surfaces defining at least parts of the nozzle passage.

2. The method of claim 1 wherein, during the sintering process, the outer walls are final-formed to a configuration adapted to be received within and supported by a nozzle tip holder without the need for further machining of the outer walls.

3. A method of forming nozzle tip parts for a plural-part nozzle tip, comprising the steps of:
   (a) forming a plurality of blanks from which nozzle tip parts will be formed, each blank including a forward wall, a rearward wall, and inner wall and outer walls;
   (b) forming a nozzle passage portion in the inner wall of at least a selected one of the blanks, the nozzle passage portion extending from the rearward wall toward the forward wall and terminating in an end formation, the step of forming a nozzle passage portion being accomplished by:
      (i) forming a first nozzle passage portion in the inner wall of a first selected one of the blanks;
      (ii) forming a second nozzle passage portion in the inner wall of a second selected one of the blanks; and
      (iii) the first and second nozzle passage portions being configured to overlie each other when the blanks are assembled with the inner walls of the first and second selected blanks in mating engagement, and being configured to provide a rounded passage end formation located near but not opening through the forward wall;
   (c) machining at least one flat surface on the selected blank near the juncture of its forward wall and its inner wall, the plane of the flat surface being oriented to intersect the end formation of the nozzle passage portion, the step of machining at least one flat surface being accomplished by:
      (i) machining a first flat surface on the first selected blank near the juncture of its forward wall and its inner wall; and,
      (ii) machining a second flat surface on the second selected blank near the juncture of its forward wall and its inner wall;
   (d) the configuration of the end formation and the orientation of the plane of the flat surface being selected such that an orifice portion of desired configuration is formed at their juncture, and such that when the blanks are assembled with the first and second flat surfaces in mating engagement, a plural-part nozzle tip is provided having a nozzle passage of desired configuration extending therethrough from the rearward walls to the forward walls of the nozzle tip parts with the nozzle passage portions and the flat surfaces defining at least parts of the nozzle passage, the nozzle tip also having an orifice of desired configuration at the junctures of the first and second flat surfaces with the rounded passage end formations.

4. A method of forming nozzle tip parts for a plural-part nozzle tip, comprising the steps of:
   (a) forming a plurality of blanks from which nozzle tip parts will be formed, each blank including a forward wall, a rearward wall, and inner wall and outer walls;
   (b) forming a nozzle passage portion in the inner wall of at least a selected one of the blanks, the nozzle passage portion extending from the rearward wall toward the forward wall and terminating in an end formation;
   (c) machining at least one flat surface on the selected blank near the juncture of its forward wall and its inner wall, the plane of the flat surface being oriented to intersect the end formation of the nozzle passage portion;
   (d) the configuration of the end formation and the orientation of the plane of the flat surface being selected such that an orifice portion of desired configuration is formed at their juncture, and such that when the blanks are assembled with certain of their inner walls in mating engagement, a plural-part nozzle tip is provided having a nozzle passage of desired configuration extending therethrough from the rearward walls to the forward walls of the nozzle tip parts with the nozzle passage portions and the flat surfaces defining at least parts of the nozzle passage;
   (e) assembling the blanks with said certain inner walls in mating engagement;
   (f) surrounding at least selected peripheral regions of the assembled blanks with a generally annular member formed from relatively resilient material; and
   (g) positioning the blanks within a nozzle tip holder with the annular member surrounding the selected peripheral regions of the assembled blanks.

5. The method of claim 4 wherein the step of assembling the blanks includes the step of positioning the annular member around the selected peripheral regions of the assembled blanks prior to the step of positioning the blanks within a nozzle tip holder, the annular member serving to hold the blanks in their assembled configuration for insertion into the nozzle tip holder.

6. A method of forming a plural-part nozzle tip, comprising the steps of:
   (a) sintering a plurality of blanks of hard, wear-resistant material to form nozzle tip parts with each part having a forward wall, a rearward wall, an inner wall and an outer wall, the forward, rearward and outer walls being final-formed during sintering and requiring no machining to enable the nozzle tip parts to be received within and supported by a nozzle tip holder;
   (b) during the sintering of the blanks, forming a nozzle passage portion in the inner wall of at least a selected one of the blanks, the nozzle passage portion extending from the selected blank's rearward wall toward its forward wall and terminating in an end formation;
   (c) machining at least one flat surface on the selected blank near the juncture of its forward wall and its inner wall, the plane of the flat surface being oriented to intersect the end formation of the nozzle passage portion;
   (d) the configuration of the end formation and the orientation of the plane of the flat surface being selected such that an orifice portion of desired configuration is formed at their juncture; and,
   (e) assembling the blanks with certain of their inner walls in mating engagement to provide a plural-part nozzle tip having a nozzle passage of desired configuration extending therethrough from the rearward walls to the forward walls of the nozzle tip parts, and with the nozzle passage portion and the flat surface defining at least parts of the nozzle passage.

7. The method of claim 6 wherein:
   (a) the step of forming a nozzle passage portion in the inner wall of at least a selected one of the blanks includes the steps of:
      (i) forming a first nozzle passage portion in the inner wall of a first selected one of the blanks;
      (ii) forming a second nozzle passage portion in the inner wall of a second selected one of the blanks;
      (iii) the first and second nozzle passage portions being configured to overlie each other when the blanks are assembled with the inner walls of the first and second selected blanks in mating engagement, and being configured to provide a rounded passage end formation located near but not opening through the forward wall;
   (b) the step of machining at least one flat surface on the selected blank includes the steps of:
      (i) machining a first flat surface on the first selected blank near the juncture of its forward wall and its inner wall; and,
      (ii) machining a second flat surface on the second selected blank near the juncture of its forward wall and its inner wall;
   (c) the configuration of the rounded passage end formations and the orientations of the planes of the first and second flat surfaces being selected such that when the blanks are assembled with the first and second flat surfaces in mating engagement, an orifice of desired configuration is provided at the junctures of the first and second flat surfaces with the rounded passage and formation.

8. A method of forming a plural-part nozzle tip from hard, difficult to machine materials, the nozzle tip parts being adapted to be supported in a nozzle tip holder, comprising the steps of:
   (a) sintering a plurality of blanks to form nozzle tip parts with each part having at least one machinable inner wall, a forward wall, a rearward wall, and an outer wall portion, the outer wall portions being adapted to be received within a nozzle tip holder without the need for a machining operation;
   (b) forming a nozzle passage portion in at least a selected inner wall of at least one blank as part of the initial sintering operation, the nozzle passage portion opening through the rearward wall;

(c) machining at least a portion of the inner wall of each of the nozzle tip parts to provide the parts with smooth, matingly engageable surfaces adapted to engage each other in substantial surface-to-surface contact when the nozzle tip parts are assembled and supported in a nozzle tip holder;

(d) machining a region of the selected nozzle tip part, the machined region being located near the juncture of the forward wall and the inner wall of the selected part, the machined region being oriented to intersect the nozzle passage portion such that an orifice portion of desired configuration is formed at the juncture of the machined region and the nozzle passage portion; and, (e) assembling the blanks with certain of their inner walls in mating engagement to provide a plural-part nozzle tip having a nozzle passage of desired configuration extending therethrough from the rearward walls to the forward walls of the nozzle tip parts, and with the nozzle passage portion and the flat surface defining at least parts of the nozzle passage.

9. A plural-part nozzle tip, comprising:

(a) a plurality of nozzle tip parts each formed from a separate blank and having a forward wall, a rearward wall, an inner wall and an outer wall, wherein:

(i) the blanks comprise sintered bodies of hard, wear-resistant material;

(ii) the forward, rearward and outer walls comprise surfaces which have been final-formed during the sintering process; and (iii) the inner walls of each of the blanks have at least portions thereof which have been machined to provide smooth, matingly engageable surface portions;

(b) a nozzle passage portion formed during the sintering process in the inner wall of at least a selected one of the blanks, the nozzle passage portion extending from the rearward wall toward the forward wall and terminating in an end formation;

(c) a flat surface machined on the selected blank near the juncture of its forward wall and its inner wall, the plane of the flat surface being oriented to intersect the end formation of the nozzle passage portion;

(d) the configuration of the end formation and the orientation of the plane of the flat surface being selected such that an orifice portion of desired configuration is formed at their juncture; and, (e) the nozzle tip parts being assembled with certain of their inner walls in mating engagement to provide a plural-part nozzle tip having a nozzle passage of desired configuration extending therethrough from the rearward wall to the forward wall, and with the nozzle passage portion and the flat surface defining at least parts of the nozzle passage.

10. A plural-part nozzle tip, comprising:

(a) a plurality of nozzle tip parts each formed from a separate blank and having a forward wall, a rearward wall, an inner wall and an outer wall;

(b) a nozzle passage portion formed in the inner wall of at least a selected one of the blanks, the nozzle passage portion extending from the rearward wall toward the forward wall and terminating in an end formation;

(c) a flat surface machined on the selected blank near the juncture of its forward wall and its inner wall, the plane of the flat surface being oriented to intersect the end formation of the nozzle passage portion;

(d) the configuration of the end formation and the orientation of the plane of the flat surface being selected such that an orifice portion of desired configuration is formed at their juncture;

(e) the nozzle tip parts being assembled with certain of their inner walls in mating engagement to provide a plural-part nozzle tip having a nozzle passage of desired configuration extending therethrough from the rearward wall to the forward wall, and with the nozzle passage portion and the flat surface defining at least parts of the nozzle passage; and (f) surrounding at least selected peripheral regions of the assembled nozzle tip parts with a generally annular member formed from relatively resilient material.

11. The plural-part nozzle tip of claim 10 wherein the annular member is adapted to be wedged into clamping engagement with the nozzle tip parts by the influence of the pressure of a liquid being sprayed through the nozzle tip.

12. A plural-part nozzle tip for an airless sprayer, comprising:

(a) a plurality of blanks sintered from hard, difficult to machine material, each blank including at least one inner wall, an outer wall, and forward and rearward walls, portions of the outer walls being adapted to be received within a nozzle tip holder without the need for a machining operation to further finish these outer wall portions;

(b) a nozzle passage portion in the inner wall of at least a selected blank, the nozzle passage portion opening through the rearward end wall;

(c) the inner wall of each blank including a smoothed portion adapted to engage the smoothed portion of at least another of the nozzle tip parts in substantial surface-to-surface contact;

(d) a machined region being formed on the selected blank, the machined region being oriented to intersect the nozzle passage portion such that an orifice portion of desired configuration is formed at the juncture of the machined region and the nozzle passage portion;

(e) the nozzle tip parts being assembled with certain of their inner walls in mating engagement to provide a plural-part nozzle tip having a nozzle passage of desired configuration extending therethrough from the rearward wall to the forward wall, and with the nozzle passage portion and the machined region defining at least parts of the nozzle passage; and (f) a packing member extending perimetrically about the outer walls of the assembled nozzle tip parts.

13. The plural-part nozzle tip of claim 12 wherein the packing member clampingly engages the nozzle tip parts and holds the nozzle tip parts together for insertion into and removal from the nozzle tip holder as a unit.

14. A plural-part nozzle tip for an airless sprayer, comprising:

(a) a plurality of blanks sintered from hard, difficult to machine material, each blank including at least one inner wall, an outer wall, and forward and rearward walls, portions of the outer walls being adapted to be received within a nozzle tip holder without the need for a machining operation to further finish these outer wall portions;

(b) a nozzle passage portion in the inner wall of at least a selected blank, the nozzle passage portion opening through the rearward end wall;

(c) the inner wall of each blank including a smoothed portion adapted to engage the smoothed portion of at least another of the nozzle tip parts in substantial surface-to-surface contact;

(d) a machined region being formed on the selected blank, the machined region being oriented to intersect the nozzle passage portion such that an orifice portion of desired configuration is formed at the juncture of the machined region and the nozzle passage portion;

(e) the nozzle tip parts being assembled with certain of their inner walls in mating engagement to provide a plural-part nozzle tip having a nozzle passage of desired configuration extending therethrough from the rearward wall to the forward walls, and with the nozzle passage portion and the machined region defining at least parts of the nozzle passage; and (f) an electrically conductive blade clampingly engaged by the nozzle tip parts and extending forwardly of the forward walls of the assembled nozzle tip parts.

15. The plural-part nozzle tip of claim 14, wherein the blade tapers to form a substantially pointed forward end.

16. The plural-part nozzle tip of claim 14, wherein the blade is aligned substantially centrally with the nozzle passage extending through the nozzle tip.

17. A plural-part nozzle tip for an airless sprayer, the sprayer including a nozzle holder for receiving the nozzle tip parts in use, comprising:

(a) a plurality of nozzle tip parts, each part including an inner wall, an outer wall, and forward and rearward walls, portions of the outer walls being adapted to be received within the nozzle tip holder without the need for a machining operation, the nozzle tip holder having at least one internal surface adapted to engage outer wall portions of the nozzle tip parts;

(b) a nozzle passage portion in the side wall of at least a selected one of the parts, the nozzle passage portion opening through the rearward wall;

(c) the inner wall of each blank including a smoothed portion adapted to engage the smoothed portion of another of the nozzle tip parts in substantial surface-to-surface contact;

(d) a machined region being formed on the selected blank, the machined region being oriented to intersect the nozzle passage portion such that an orifice portion of desired configuration is formed at the juncture of the machined region and the nozzle passage portion;

(e) the nozzle tip parts being assembled with certain of their inner walls in mating engagement to provide a plural-part nozzle tip having a nozzle passage of desired configuration extending therethrough from the rearward wall to the forward wall, and with the nozzle passage portion and the machined region defining at least parts of the nozzle passage; and, (f) an annular packing member in engagement with the assembled nozzle tip parts, the packing member being of a resilient material which, under operating conditions, expands to wedge and seal the nozzle tip parts tightly together within the nozzle tip holder.

18. The plural-part nozzle tip of claim 17, wherein the packing member comprises a resilient encapsulating structure holding the nozzle tip parts together as a unit, the packing member extending perimetrically about selected regions of the outer walls of the assembled nozzle tip parts.

19. A method of forming a plural-part electrostatic nozzle tip, comprising the steps of:

(a) forming a plurality of blanks from which nozzle tip parts will be formed, each blank including a forward wall, a rearward wall, an inner wall and an outer wall;

(b) forming a nozzle passage portion in the inner wall of at least a selected one of the blanks, the nozzle passage portion extending from the rearward wall toward the forward wall and terminating in an end formation;

(c) machining at least one flat surface on the selected blank near the juncture of its forward wall and its inner wall, the plane of the flat surface being oriented to intersect the end formation of the nozzle passage portion;

(d) the configuration of the end formation and the orientation of the plane of the flat surface being selected such that an orifice portion of desired configuration is formed at their juncture;

(e) providing an electrically conductive blade adapted to be clampingly engaged between inner wall portions of at least two of the nozzle tip parts and adapted to extend forwardly of the forward walls of the assembled nozzle tip parts; and, (f) assembling the blanks and the blade with the blade clamped between inner wall portions of at least two of the blanks with the inner wall portions matingly engaging opposed surfaces of the blade to a provide plural-part nozzle tip having a nozzle passage of desired configuration extending therethrough from the rearward walls to the forward wall of the nozzle tip part, and with the nozzle passage portion and the flat surface defining at least parts of the nozzle passage.

20. The method of claim 19 additionally including the step of forming a nozzle passage part within the electrically conductive blade whereby, when the nozzle tip parts and the blade are assembled, at least a part of the nozzle passage is formed by the nozzle passage portion formed in the blade.

21. A plural-part electrostatic nozzle tip, comprising:

(a) a plurality of nozzle tip parts each formed from a separate blank and having a forward wall, a rearward wall, an inner wall and an outer wall;

(b) a nozzle passage portion formed in the inner wall of at least a selected one of the blanks, the nozzle passage portion extending from the rearward wall toward the forward wall and terminating in an end formation;

(c) a flat surface machined on the selected blank near the juncture of its forward wall and its inner wall, the plane of the flat surface being oriented to intersect the end formation of the nozzle passage portion;

(d) the configuration of the end formation and the orientation of the plane of the flat surface being selected such that an orifice portion of desired configuration is formed at their juncture;

(e) an electrically conductive blade adapted to be clampingly engaged between inner wall portions of at least two of the nozzle tip parts; and, (f) the nozzle tip parts being assembled with the electrically conductive blade clampingly engaged between inner wall portions of at least two of the nozzle tip parts and extending forwardly of the forward walls of the assembled nozzle tip parts, the assembly defining a nozzle passage of desired configuration extending therethrough from the rearward wall to the forward wall.

* * * * *